June 4, 1957   B. N. WATTS ET AL   2,794,926
APPARATUS FOR THE DETECTION OF INFRARED RADIATION
Filed Aug. 20, 1954
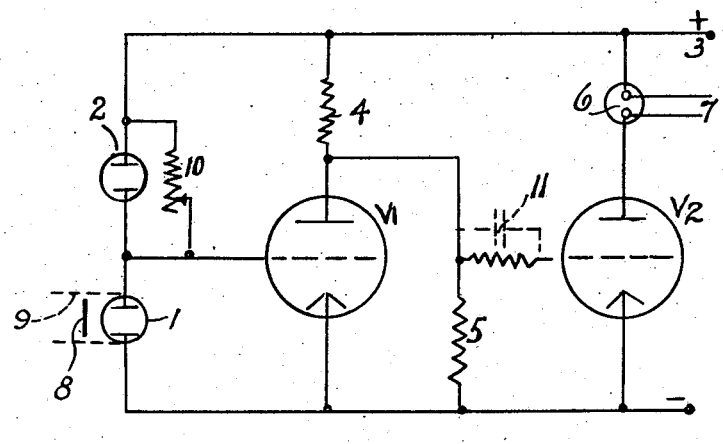
INVENTORS
BERNARD NELSON WATTS,
JOHN RAYMOND HOWELLS,
BY 
ATTORNEY

United States Patent Office 2,794,926
Patented June 4, 1957

2,794,926
APPARATUS FOR THE DETECTION OF INFRARED RADIATION

Bernard Nelson Watts, Rugby, and John Raymond Howells, Church Lawford, Rugby, England, assignors to The British Thomson-Houston Company Limited, a British company Application August 20, 1954, Serial No. 451,182

Claims priority, application Great Britain August 25, 1953

3 Claims. (Cl. 250—83.3)

This invention relates to the detection of infra-red radiation by the use of an infra-red-sensitive photo-electric cell such as one employing lead sulphide as the infra-red-sensitive material.

When apparatus utilising an infra-red-sensitive electric cell is to be rendered responsive to the presence of infra-red radiation from a particular potential source of such radiation, e. g. when the apparatus is to indicate a condition of overheating precedent to the occurrence of fire or the like, it is important that while sensitive to overheating at such source, it should not respond to changes in ambient temperature, such as those which might be expected to occur in very hot weather, which conditions might result in the giving of a false alarm by the apparatus.

It is an object of the invention to provide an infra-red-sensitive alarm or detection apparatus which is substantially immune from false indication from extraneous sources of heat or light.

According to the invention an infra-red-sensitive electric cell to be responsive to the emission of infra-red radiation from a predetermined source thereof, is connected in series with a source of electric potential in a balancing circuit with a second or auxiliary similar cell to the input circuit of an amplifying device, preferably of the thermionic valve type, so that a change in resistance of both cells, caused by a change in ambient temperature or light, produces no effective change in the input circuit of the amplifying device, the cell which is to be responsive to radiation from a predetermined source being rendered more sensitive to that radiation, than the other cell, whereby on the emission of radiation from the predetermined source, there is produced in the input circuit of the amplifying device, an effective change so as to produce a response in the output circuit thereof.

In carrying out the invention we may render the cell which is to be responsive to radiation from the predetermined source more sensitive to that radiation, by shielding it from other possible sources of radiation, such as by using a shield 9, while leaving the second cell exposed; or by inserting in front of the first cell, a filter which allows only a relatively narrow band of those infra-red rays which are emitted from the predetermined source to reach the cell.

The balancing of the input circuit of the amplifying device when a thermionic valve is used as such, may be effected by connecting the first cell between the grid and the cathode of the valve, the second cell being connected between the grid and the source of potential to which the anode of the valve is connected, that source of potential then serving also as the source for energising both cells.

In order to enable any differences in the characteristics of the two cells to be adjusted we may connect across either of them a balancing resistor of an adjustable value.

The two cells are preferably so located that, apart from the filter associated with the first cell, they both have a similar "out-look" to the region from which the radiation from the predetermined potential source of radiation is expected.

A circuit arrangement which may be employed in carrying the invention into effect is illustrated in the accompanying drawing.

In the drawing we have shown the amplifying device as being of the thermionic valve type employing two valves $V_1$ and $V_2$ in cascade. The main infra-red-sensitive cell 1 is connected between the grid and cathode of the valve $V_1$. Cell 1 is the infra-red cell which is to be rendered more sensitive to radiation from a predetermined possible source of infra-red radiation. An auxiliary infra-red sensitive cell 2 together with the cell 1 are connected in a balancing circuit to the input of the valve $V_1$, the cell 2 having one terminal connected to the grid of valve $V_1$ and the other terminal connected to a source of potential of which the positive terminal 3 is indicated. The source is connected through the usual anode resistance 4 to the anode of valve $V_1$. The anode of valve $V_1$ is connected through a normal type of resistance coupling circuit 5 to the grid of valve $V_2$. The anode of valve $V_2$ is connected through a relay 6 to the positive terminal 3 of the source of anode potential, thus serving to actuate an indicating or alarm circuit 7.

When radiation from a high temperature source such as the sun or other light source is incident upon the two cells, a considerable proportion of the incident radiation is cut-off by the filter 8 in front of cell 1. The relative sensitivities of the two cells are then adjusted, by the parallel resistor 10, so that the resultant resistance changes in the two arms of the circuit are equal. Therefore no change in the potential of the grid of the valve $V_1$ occurs.

However, if radiation from a low temperature source, e. g. 100° C. falls on the two cells the filter in front of cell 1, cuts off very little of the radiation. Therefore, owing to the adjusted sensitivities of the two cells the resistance change in the arm containing cell 1 is very much greater than in the arm containing cell 2. This results in a change of potential in the grid of valve $V_1$. The change in anode current reduces the current through valve $V_2$ and allows the relay 6 to be de-energised, thus closing the alarm circuit 7.

If the expected source of radiation is of an intermittent character, the resistance coupling circuit 5 may be replaced by a resistance-capacity coupling circuit using a condenser 11 as shown in interrupted lines.

Further stages of amplification may be employed if desired.

What we claim and desire to secure by Letters Patent of the United States is:

1. Apparatus responsive to infra-red radiation comprising an infra-red sensitive cell, electron valve means for amplifying changes in the conductivity of said cell, an auxiliary infra-red sensitive cell, means connecting said auxiliary cell in balanced circuit arrangement with said first mentioned cell to the input circuit of said amplifying means, whereby similar changes in radiation incident upon both of said cells produce no change in the output from said amplifying means, means connected to the output of said amplifying means to respond to changes of current therein, and means for rendering said first mentioned cell more responsive to infra-red radiation from a predetermined source thereof than said auxiliary cell.

2. Apparatus as claimed in claim 1, in which the first mentioned cell is connected between the grid and cathode of a thermionic tube in said amplifying means, and said auxiliary cell is connected between the grid of said thermionic valve and a point at a positive potential with respect to the anode of said thermionic tube.

3. Apparatus responsive to infra-red radiation comprising in combination, an electronic amplifier comprising an electron discharge device, a source of anode potential for said amplifier, two infra-red sensitive cells connected in series with each other by a conductor, said two series-connected infra-red sensitive cells connected across said source of anode potential, said conductor connected to the grid of said electron discharge device, and filter means for selecting the radiation effecting one of said infra-red sensitive devices.

References Cited in the file of this patent

UNITED STATES PATENTS

| | | |
|---|---|---|
| 2,193,606 | Ulrey | Mar. 12, 1940 |
| 2,490,011 | Bird | Dec. 6, 1949 |